United States Patent [19]
Usui et al.

[11] Patent Number: 6,160,779
[45] Date of Patent: Dec. 12, 2000

[54] INFORMATION RECORDING AND REPRODUCING DEVICE AND METHOD

[75] Inventors: Makoto Usui, Osaka; Hironori Deguchi, Kadoma, both of Japan

[73] Assignee: Matsushita Electric Industrial Co., Ltd., Osaka-fu, Japan

[21] Appl. No.: 09/172,128

[22] Filed: Oct. 14, 1998

[30] Foreign Application Priority Data

Oct. 14, 1997 [JP] Japan .................................. 9-280131

[51] Int. Cl.⁷ ...................................................... G11B 7/00
[52] U.S. Cl. .................. 369/59; 369/47; 369/58
[58] Field of Search .................................. 369/47, 48, 49, 369/50, 54, 58, 59, 32; 360/48, 51, 53

[56] References Cited

U.S. PATENT DOCUMENTS 5,138,599  8/1992  Fukushima et al. .................. 369/58 X
5,414,689  5/1995  Maeda et al. .......................... 369/59 X
5,959,948  9/1999  Oshima et al. ........................ 369/47 X

FOREIGN PATENT DOCUMENTS 5-335973  12/1993  Japan .

*Primary Examiner*—Muhammad Edun
*Attorney, Agent, or Firm*—Wenderoth, Lind & Ponack, L.L.P.

[57] ABSTRACT

A recording and reproducing device including a Viterbi decoder which improves address reading rate but has some amount of delay in decoding process, starts ALPC (Automatic Laser Power Control) operation by opening a write gate at the record start position of a sector, re-appraises recording suitability for the sector in question when the result of reading the last address of the sector comes out during the ALPC area, and terminates ALPC operation by closing the write gate at any point by the start of data recording area of the sector when the sector is not suitable for recording so as not to perform recording operation subsequently.

7 Claims, 6 Drawing Sheets

INFORMATION RECORDING AND REPRODUCING DEVICE AND METHOD

BACKGROUND OF THE INVENTION

1. Field of the Invention

The present invention relates to an information recording and reproducing device and method, more particularly, for recording digital information in sector units on data storage media such as optical disks.

2. Description of the Related Art

In an information recording and reproducing devices for recording and reproducing digital information, magnetic disks, optical disks or the like are used as recording media. In such devices, the recording area of the disk is divided up into minute segments called sectors, and recording and reproducing are effected by the sector. The size of the sector is usually from 512 bytes to 2 Kbytes.

Such a recording and reproducing device, in order to achieve random access, must identify each individual sector without mistake. For this purpose, a track sector address is written at the head of each sector as an identifier. This is usually called ID. The ID plays a vital role in recording or fetching of information. Therefore the recording of ID is usually duplicated a plurality of times so that the target sector can be accessed even if some of the information of ID is lost due to media defects etc. For example, in the case of a 128 MB magneto-optic disk, the same track sector address is written three times, while in the case of a DVD-RAM it is written four times.

Usually, there is provided a gap area (called "GAP area") immediately after an ID area in which IDs are recorded. The GAP area is a buffer area for the purpose of effecting transition to recording operation after ID reproduction. After the GAP area a data record area follows.

In particular, for a recorded and reproduced optical disk, test emission from a laser diode is performed from the GAP area for each recorded sector so as to calibrate the emission power for recording. For this reason, in the optical disk, this GAP area is also known as the ALPC (Automatic Laser Power Control) area. The laser power is increased up to recording power for this calibration, it must be performed in an unrecorded data area i.e. GAP area.

The GAP area from the end of the ID to the data recording area may be made as small as possible for recording more information.

Accordingly when information is recorded, the information recording and reproducing device must read the ID and then rapidly determine whether the sector in question is a sector that is to be recorded. Then, the device starts recording operation simultaneously with the beginning of data recording area coming immediately after the GAP area. In particular in an optical disk device, since, as mentioned above, calibration of the recording power of the semiconductor laser is performed in the GAP area for each recording sector, it is necessary to make a decision as to whether or not the sector in question is one that may be recorded earlier than the timing when the data record area starts.

The specific operation of a prior art information recording and reproducing device in when data is recorded will now be described.

FIG. 4 is a block diagram of the prior art information recording and reproducing device.

In FIG. 4, the information recording and reproducing device comprises an optical head 401, a head amplifier 402, an analogue read channel 403, a data demodulator 404, a address demodulator 405, first to fourth preset registers 406–409, first to fourth comparators 410–413, a write gate start pulse generator 414 and a write gate generator 416.

The optical head 401 records signals to an optical disk 400 and reproduces signals from the optical disk 400 by using a laser beam. The optical head 401 includes a laser diode and a photodetector.

The head amplifier 402 produces an RF signal by amplifying the signal from the photodetector.

The analogue read channel 403 equalizes and digitizes the RF signal read from the head amplifier 402.

The data demodulator 404 demodulates the data from the digitized output of the read channel 403. The address demodulator 405 demodulates track sector address from the digitized output of the read channel 403.

The preset registers 406–409 store the track and sector address of the sector set beforehand, which is to be recorded. In this example, it is assumed that the address is written four times, these having respective identifying bits, therefore four preset registers 406–409 are shown.

The first comparator 410 compares the address output from the address demodulator 405 with the address stored in the first preset register 406. If they are the same, the first comparator 410 outputs a detection pulse. The second to fourth comparators 411–413 likewise output a detection pulse if the address output from address demodulator 405 is the same as the address stored in the second to fourth preset registers 407–409.

The write gate start pulse generator 414 sends a pulse to the write gate generator 416 when a certain condition of the detection pulses from four comparators 410–413 is satisfied. The condition, for example, is satisfied when detection pulses are detected from two or more of four comparators 410–413, with the output timing of fourth comparator 413 (if there is no output from fourth comparator 413, the timing is interpolated).

Record gate generator 416 generates a write gate signal with length corresponding to the length of the data record area in a sector. The write gate signal is a signal to control the data recording operation. The recording operation is performed when the write gate signal is active (high), while the recording operation is not performed when the write gate signal is inactive (low). In the following description, a term "a write gate" is often used, which means a write gate signal. That is, the recording operation is performed when the write gate is open, while the recording operation is not performed when the write gate is closed.

The information recording and reproducing device further comprises a data modulator 417 and a laser power controller 418.

The data modulator 417 applies modulation in respect of the data to be recorded.

The laser power controller 418 controls the output power of the laser that is mounted in the optical head 401. In addition to the modulated data, the write gate signal is input to the laser power controller 418. While the write gate is closed, the laser power controller 418 controls the laser power to the minimum necessary power (called "the read power") required for data reading from the disk, such that the data on the disk is not unintentionally overwritten or erased.

FIG. 5 is an operational timing chart of the information recording and reproducing device in the prior art. In FIG. 5, the recording position on the disk represents diagrammatically a signal format actually impressed on the disk. ID1 is the first ID of the IDs that are written four times, ID2 is the second ID, ID3 is the third ID and ID4 is the fourth ID. The symbols "x" written below ID2 and ID4 in FIG. 5 indicate fault of reading ID2 and ID4 (i.e. the results of checking CRC code encoded in the ID2 and ID4 are "NG (No Good)"). The symbols "o" written below ID1 and ID3 indicate success of reading ID1 and ID3 (i.e. the results of checking CRC code encoded in the ID1 and ID3 are "OK (All Right)"). The output signals of four comparators 410–413 are also shown respectively in the timing chart.

In the timing chart, since ID1 and ID3 have been read successfully, pulses are only generated in output signals of the first comparator 410 and the third comparator 412.

In FIG. 5, the output of write gate start pulse generator 414 and the write gate signal are also shown. Since two of the four IDs are read successfully, the write gate start pulse generator 414 outputs a pulse at the timing of the end of ID4. Triggered by this pulse, the write gate generator 416 opens the write gate, i.e. makes the write gate signal active (high) for a certain time. When the write gate is opened, i.e. the write gate signal is active, the recording operation can be started. The laser power controller 418 is therefore actuated actual data recording operation after laser power calibration.

In practice a servo control circuit of the optical head 401 is necessary.

FIG. 6 is another operational timing chart of the information recording and reproducing device in a prior art. In this figure, the output signals of four comparators 410–413, the write gate start pulse generator 414 and the write gate generator 416 are also shown. In this example, reading of ID1, ID2 and ID3 have failed, while reading of ID4 has succeeded.

Because of the success of reading ID4, in the timing chart, a pulse is output only in the output signal of the third comparator 412. Since only one of the four IDs could be read, no pulse is output by the write gate start pulse generator 414. Therefore, the write gate generator 416 keeps the write gate signal inactive. The recording operation is therefore not begun.

As explained before, the information recording and reproducing device has a signal processing unit called a read channel (the analogue read channel 403). The read channel 403 receives output from the head amplifier 402, equalizes received signal, digitizes equalized signal etc. and then passes the processed signal to the digital modulation and demodulation unit.

SUMMARY OF THE INVENTION

The read channel includes analogue elements in the prior art. However, in recent years with the development of digital signal processing techniques, digital filter processing and Viterbi decoding processing have become possible instead of use of analogue filters by direct A/D conversion of the high-frequency RF signal. Such digital processing techniques have the advantage in respect to improving the error rate of the decoded signal.

However, signal delay due to the decoding is in principle unavoidable since shift registers and/or path memories etc. are employed in the units for digital processing. The delay time of a Viterbi decoder is described in for example Japanese Laid-Open Patent Publication No. 5-335973 "Viterbi Decoder and Decoder for Convolution Code".

For a typical examples, the circuit delay is of the order of 10 clock pulses in a conventional analogue read channel, while in the case of a digital read channel an input to output delay for a FIR filter is about 20 clock pulses and a decoding time of 60 clock pulses is required for the Viterbi decoder. Consequently, even if it is assumed that there are no other overheads, a total signal delay of 20+60=80 clock pulses is generated. The clock pulses referred to here are based on the read clock of the reproduction signal.

In a reproducing operation, this decoding delay is not a problem. However in a recording operation, it becomes a problem when digital processing is applied to the address area. That is, in case of application of digital filter processing and Viterbi decoding to demodulation of the address area (ID area), it is delayed 80 or more clock pulses from the actual end position of ID4 on the disk that the CRC decoding result after demodulation of ID4 passed through the read channel is obtained.

Consequently, when the decision as to whether or not the current sector is to be recorded depends on the result of demodulation of ID4, there is a problem that the write gate cannot be opened for an interval of 80 clocks after the end position of ID4. Therefore, for a conventional construction in which the recording power calibration is commenced after the write gate is opened and then the recording operation is commenced, the problem is that this operation cannot be implemented from the point of view of time. That is, the recording power calibration is not completed in the GAP area. Also, starting the recording operation that neglects ID4 should be avoided because of problems with regard to the reliability of data recording.

The present invention provides an information recording and reproducing device which can correctly ascertain the address and start the recording operation from the correct position on the data format, even though with a large decoding delay time caused by a demodulator such as a digital filter or Viterbi decoder etc.

The present invention consists of an information recording and reproducing device for recording data on a recording medium having a plurality of sectors, said sector having an ID area and data area, said ID area containing a plurality of ID data, each ID data carrying information to identify the sector.

The device comprises: a demodulator to demodulate said plurality of ID data; a first gate controller to generate an enable signal to enable recording of the sector on said recording medium when at least one of the ID data is demodulated by said demodulator; and a second gate controller to determine whether or not the sector is unsuitable for recording when all of ID data are demodulated by said demodulator, and to terminate generating said enable signal when the sector is determined to be unsuitable for recording.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

Preferred embodiment of the information recording and reproduction device according to the present invention will be described below with reference to the accompanying drawings.

The information recording and reproduction device according to the present invention treats data recorded in a recording medium such as an optical disk, magneto-optical disk etc. In such a recording medium, recording area is divided by the sectors. Each sector which has the ID area, the GAP area and the data record area. In the ID area, IDs are repeatedly written as a sector identifier including a track sector address. Each ID includes encoded CRC code for error checking. In the data record area, data is written. The GAP area is used for laser power control for recording.

Figure 1:
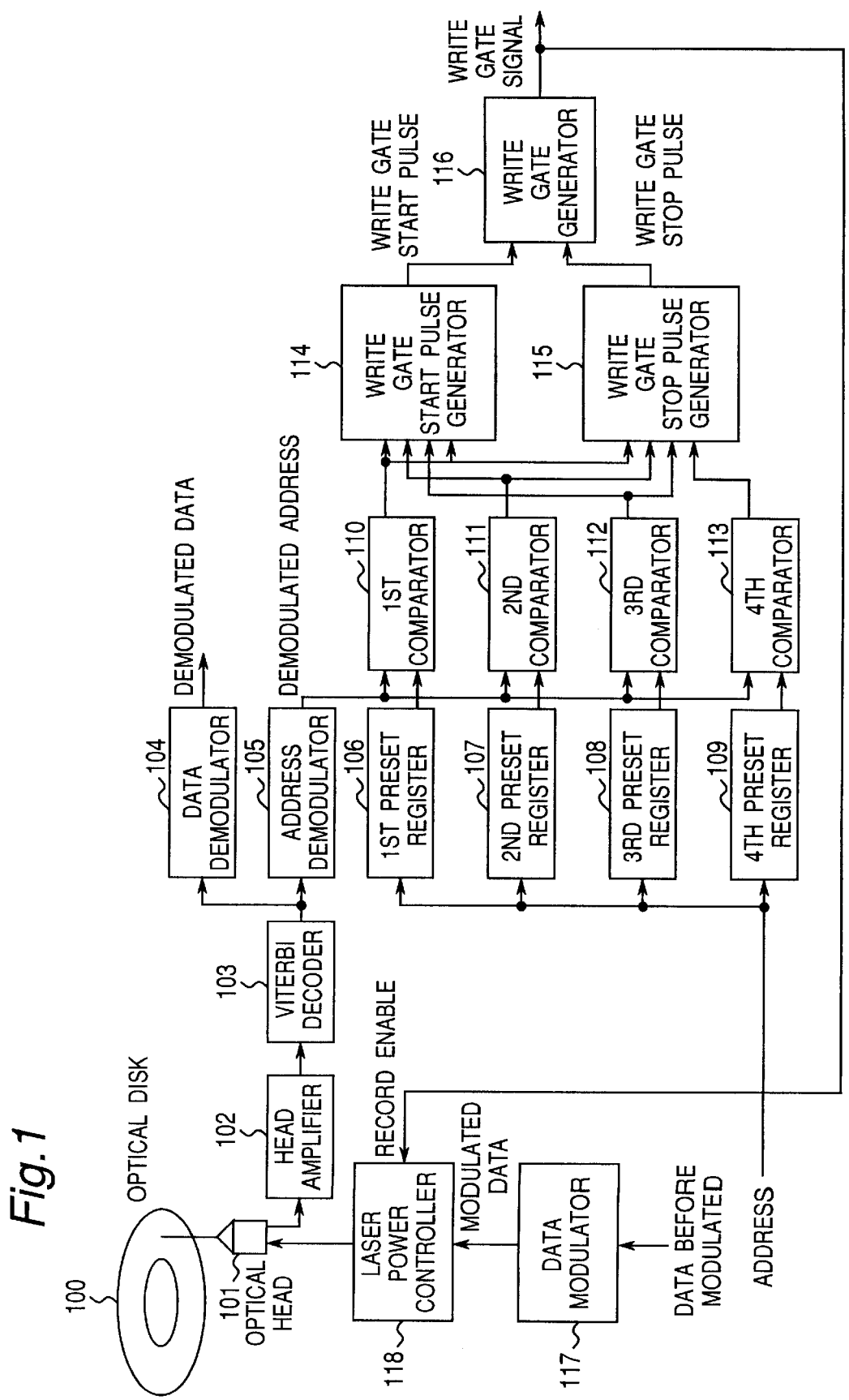
FIG. 1 is a block diagram of a preferred embodiment of the present invention.

FIG. 1 is a block diagram of a preferred embodiment of an information recording and reproducing device according to the present invention.

In FIG. 1, the information recording and reproducing device comprises an optical head 101, a head amplifier 102, an Viterbi decoder 103, a data demodulator 104, an address demodulator 105, first to fourth preset registers 106–109, first to fourth comparators 110–113, a write gate start pulse generator 114, a write gate stop pulse generator 115 and a write gate generator 116.

The optical head 101 records reproduces signals to an optical disk 100 and reproduces signals from the optical disk 100 by using a laser beam. The optical head 101 includes a laser diode and a photodetector.

The head amplifier 102 produces a RF signal by amplifying the signal from the photodetector.

The Viterbi decoder 103 includes a circuitry for A/D conversion for the analogue R/F signal from the head amplifier 102, a circuitry for digital filtering, a circuitry for Viterbi decoding, a circuitry for PLL and a circuitry for transferring the digitized data to the data demodulator 104 and the address demodulator 105.

The data demodulator 104 demodulates the data. The address demodulator 105 demodulates the address from the digitized data. The address demodulator 105 checks the CRC code of digitized data in the demodulating operation, and outputs the demodulated address when the result of checking CRC code is "OK (All Right)". The data demodulator 104 and the address demodulator 105 may be combined. The Viterbi decoder 103 and the address demodulator 105 constitute an address demodulation circuit for demodulating address recorded on the disk 100.

The first preset register 106 stores the sector track and the sector address set beforehand, in which data is to be written on the disk. In this embodiment, the address is written for example four times, each having respective characteristic identification bits. Therefore, there are totally four preset registers 106–109.

The first comparator 110 compares the address output from the address demodulator 105 with the address stored in the first preset register 106. When they are the same, the first comparator 110 outputs a detection pulse that indicates success of reading ID. When the result of checking CRC code encoded in the address is "NG (No Good)", the address demodulator 105 does not output data. The second to fourth comparators 111–113 likewise output a detection pulse if the address output from address demodulator 105 is the same as the address stored in the second to fourth preset registers 107–109, respectively.

The write gate start pulse generator 114 outputs a start pulse when a first recording condition is satisfied. The first recording condition is the condition for provisionally opening the write gate and indicates that the sector is provisionally identified to be recorded. The first recording condition is to read successfully at least one of three IDs i.e. to receive at least one detection pulse from any one of the first to third comparators 110–112 in this embodiment. The output of fourth comparator 113 is not input to the write gate start pulse generator 114, because the output timing of the write gate start pulse generator 114 is earlier than the output timing of fourth comparator 113.

The write gate stop pulse generator 115 generates a stop pulse when a second recording condition is not satisfied. The second recording condition determines whether or not the sector in question is unsuitable for recording. The sector is unsuitable for recording when it can not be identified as a sector to be recorded, for example, when the address of the sector is not identified. When the sector is unsuitable for recording, the write gate is closed, if not, the write gate keeps open. The second recording condition is satisfied when the two or more ID is read successfully i.e. two or more of the four output pulses is obtained from comparators 110–113 at the end of the demodulation for ID4 in this embodiment. The timing at which the stop pulse can be generated is the timing at which the ID4 having passed through the Viterbi decoder 103 has been demodulated. It is in fact in the vicinity of the middle of the GAP area.

The write gate generator 116 operates to generate a write gate signal comprising a predetermined number of clock pulses in response to a pulse from the write gate start pulse generator 114. Furthermore, the write gate generator 116 operates to terminate generating the write gate signal (inactivate the write gate signal) i.e. close the write gate when it receives the stop pulse from the write gate stop pulse generator 115. As described before, the write gate is treated as the operation enable signal of the circuit for recording, that is, the write gate controls a recording operation.

The data modulator 117 modulates the data to be recorded and outputs the modulated data to the laser power controller 118.

The laser power controller 118 controls the output power of a laser mounted in the optical head 101. The laser power controller 118 inputs the write gate signal as well as the modulated data as a record enable signal. The record enable signal corresponds to the write gate signal. The laser power controller 118 starts the calibration of the laser power, when receives the record enable signal from the write gate generator 116 or the write gate signal becomes active. By this calibration, the laser power is increased up to the recording power. The calibration of the laser power must be performed only in the GAP area. While the write gate is closed or the record enable signal is inactive, the laser power controller 118 controls the laser power to the minimum necessary power (called "the read power") required for data reading from the disk, such that the data on the disk is not unintentionally overwritten or erased.

The information recording and reproducing device according to the invention opens provisionally the write gate of the sector to be recorded when at least one of the ID is successfully modulated, then re-appraises whether or not the sector is suitable for recording when a predetermined number of IDs are demodulated and closes the write gate when the sector is unsuitable for recording. Thus, the recording and reproducing device allows the laser power adjustment to be completed during passing GAP area.

Figure 2:
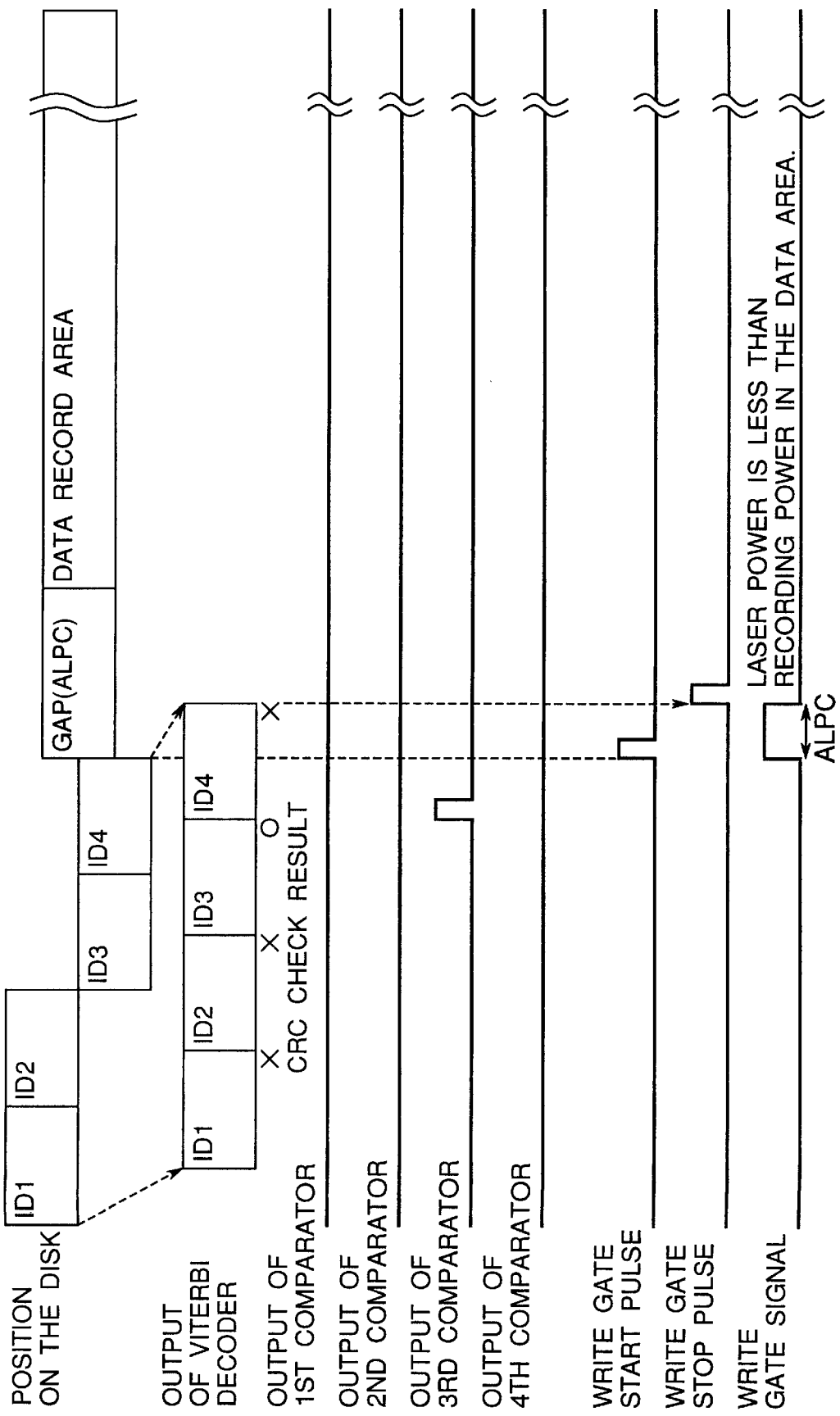
FIG. 2 is one example of a timing chart of the preferred embodiment according to the present invention.

FIG. 2 is one example of an operational timing chart of the information recording and reproducing device of this embodiment. The embodiment will be described in more detail with reference to FIG. 2.

In FIG. 2, the recording position on the disk represents diagrammatically a signal format actually impressed on the disk. ID1 is the first ID of the IDs, which are written four times on the disk. ID2 is the second ID, ID3 is the third ID and ID4 is the fourth ID. In FIG. 2, the symbol "x" indicates fault of reading ID (i.e. the result of checking CRC code encoded in the ID is "NG (No Good)") and the symbol "o" indicates success of reading ID (i.e. the result of checking CRC code encoded in the ID is "OK (ALL Right)"). In this case, reading of ID1, ID2 and ID4 have failed but reading of ID3 has succeeded (i.e. the result of checking CRC code encoded in the ID was "OK"). The output Viterbi decoder 103 is shown in FIG. 2 with some amount of delay. The time delay occurs due to digital filtering and Viterbi decoding. The output signals of first to fourth comparators 110–113 are also shown respectively in the timing chart.

In the timing chart, since ID3 has been read successfully, a pulse appears only in the output signal of the third comparator 112.

The output of the write gate start pulse generator 114 is also shown in the timing chart as "write gate start pulse". Since success was achieved in reading at least one of the four IDs, the first recording condition is satisfied. Therefore the write gate start pulse generator 114 outputs a pulse at the timing at which the write gate signal ought to be generated, i.e. at which the GAP area starts. The timing is obtained by means of counting a predetermined number of clock pulses from the time-point when the result of CRC for ID3 as "OK" is obtained. Triggered by this pulse, the write gate generator 116 provisionally opens the write gate i.e. makes the write gate signal active (high). Thus the record enable signal becomes active.

When the write gate is opened or the record enable signal becomes active, the laser power controller 118 starts recording operation and commences the laser power calibration or ALPC operation. The details of this laser power controller 118 and the data modulator 117 are not directly related to the present invention so a description thereof is omitted.

When demodulation of ID4 is terminated, the write gate stop pulse generator 115 checks the second recording condition. In FIG. 2, reading of ID4 has failed i.e. the check result of CRC was "NG". Only one of the four IDs (ID1 to ID4) has been read successfully. The second recording condition therefore is not satisfied.

Accordingly the write gate stop pulse generator 115 outputs the stop pulse to the write gate generator 116. In fact, the information that the result of checking CRC of ID4 is "NG" is necessary for the write gate stop pulse generator 115, but to facilitate understanding of the description this is omitted from the timing chart.

When receiving the stop pulse, the write gate generator 116 immediately operates to close the write gate, i.e. inactivate the write gate signal. Thus the record enable signal becomes inactive. When the write gate is closed or the record enable signal becomes inactive, the laser power controller 118 immediately discontinues calibration of the laser power, and thereafter puts the laser power down to the reproducing power.

In this case, the write gate is open for a part of the GAP area, so the laser is emitted onto the disk 100 with the recording power during this interval. Therefore, some data are written in the part of the GAP area. However this causes no problems in practice because the demodulating circuit comprising the Viterbi decoder 103 and the address demodulator 105 normally ignores data written in the GAP area (ALPC area) when this sector is read afterward.

Figure 3:
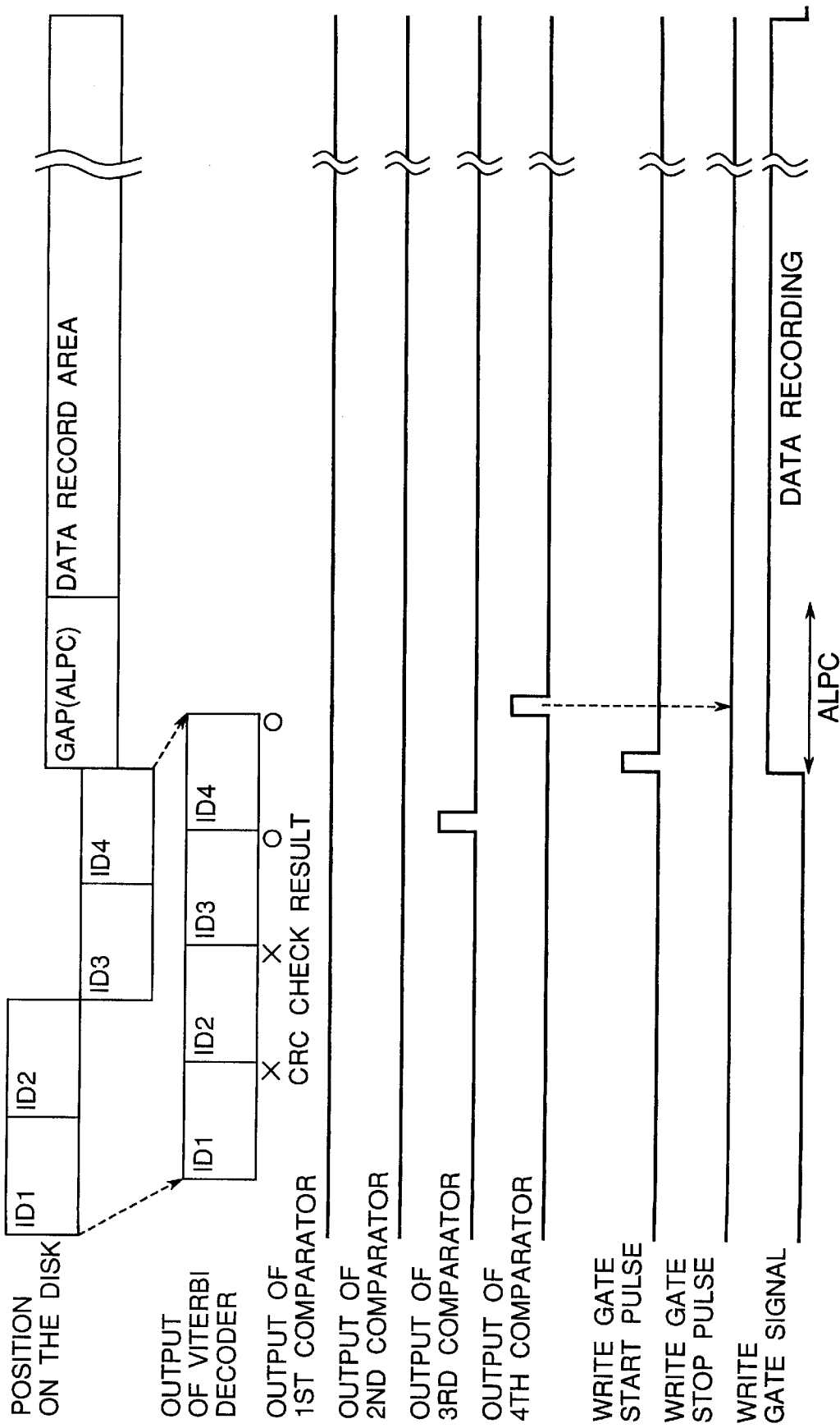
FIG. 3 is another example of a timing chart of the preferred embodiment according to the present invention.
Figure 4:
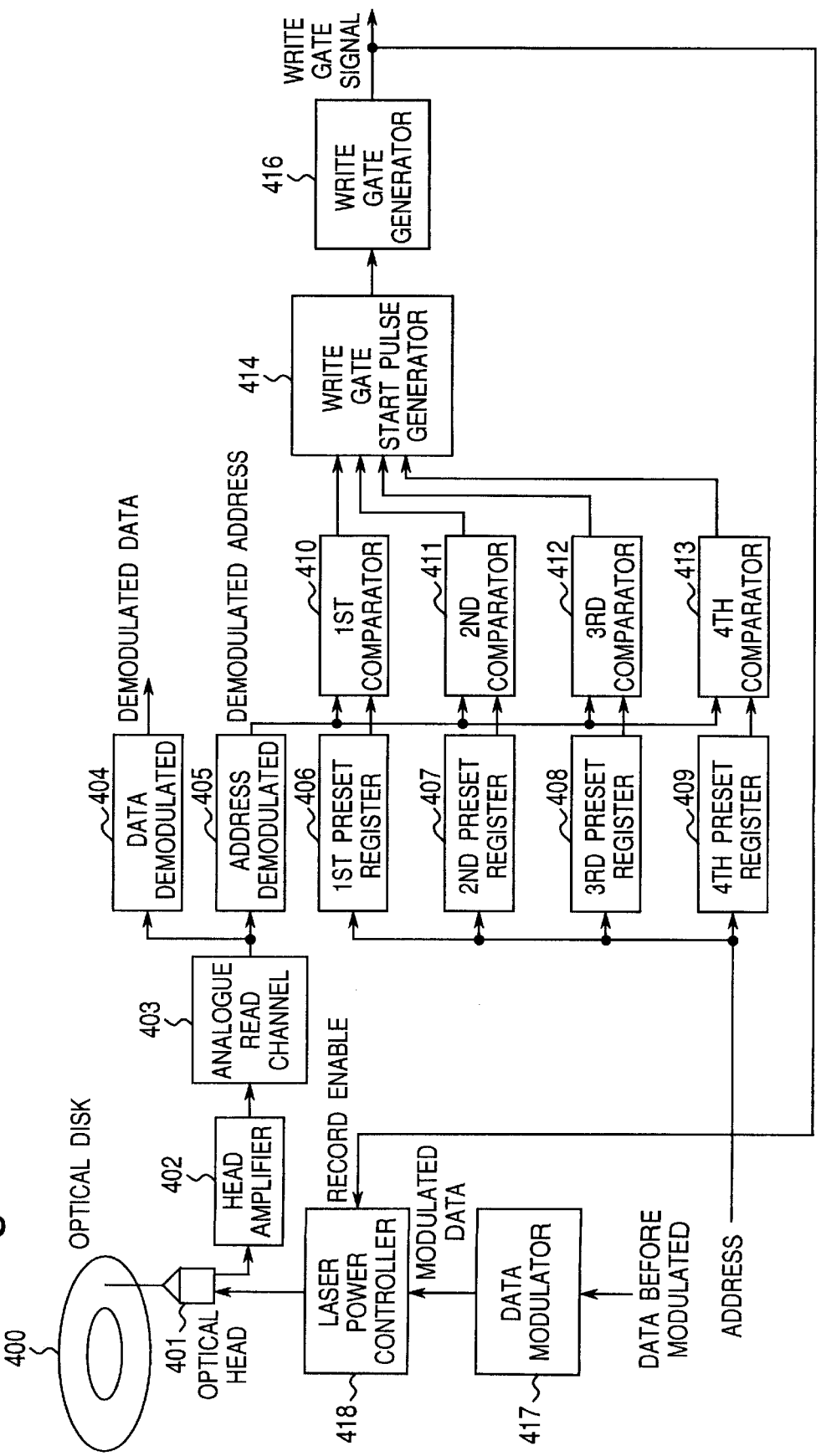
FIG. 4 is a block diagram of an information recording and reproducing device in a prior art.
Figure 5:
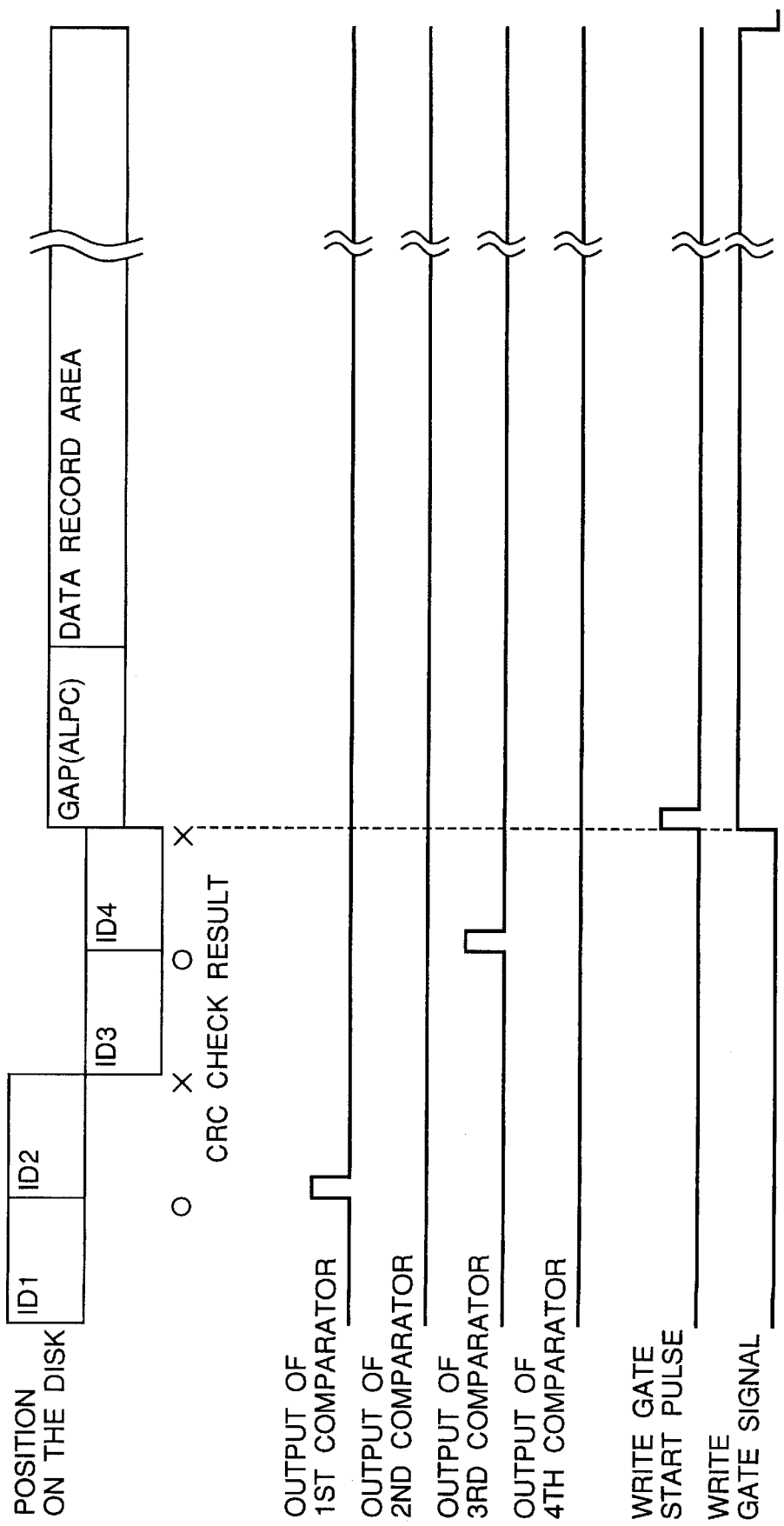
FIG. 5 is one example of a timing chart of an information recording and reproducing device in a prior art.
Figure 6:
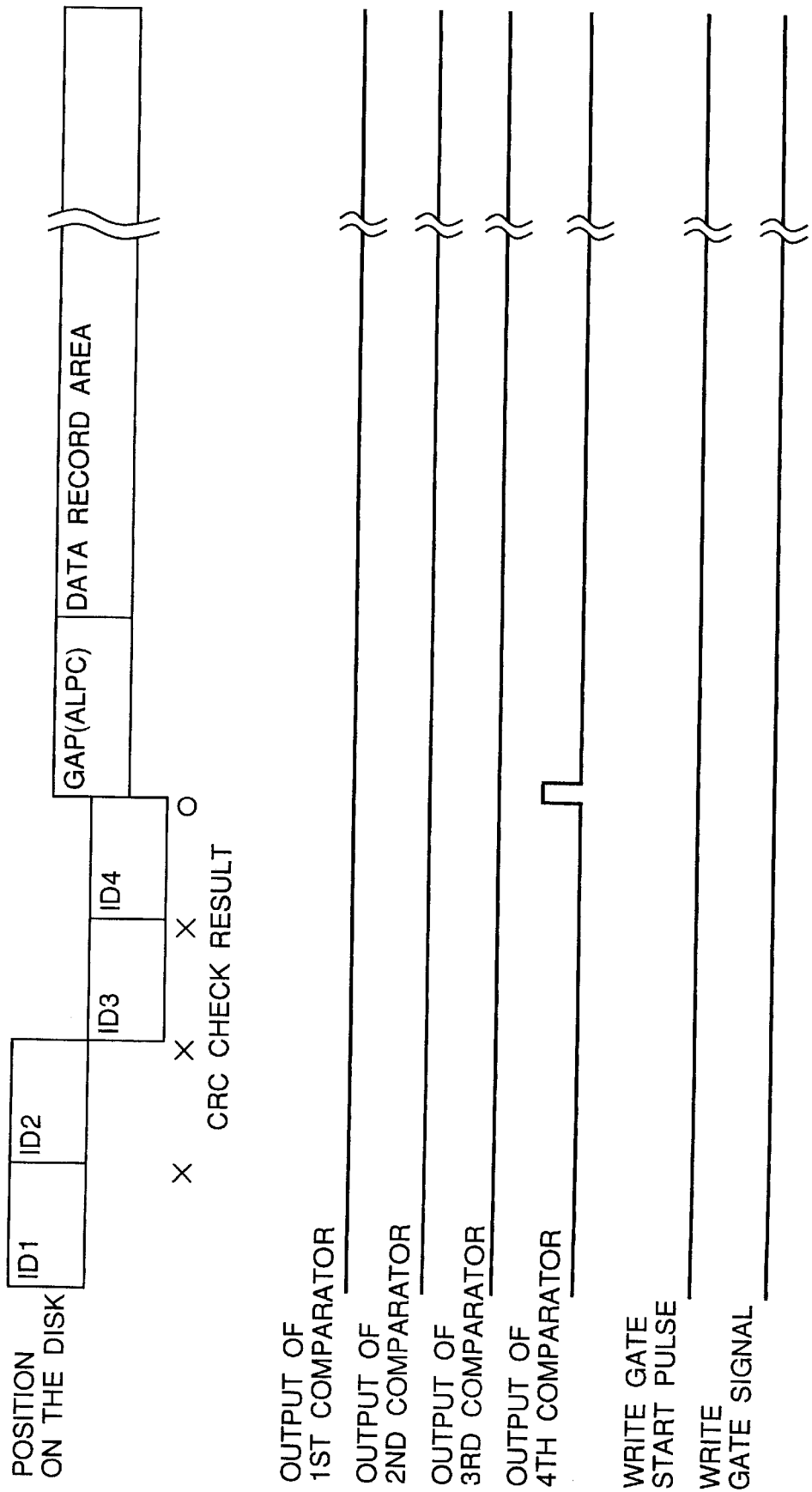
FIG. 6 is another example of a timing chart of an information recording and reproducing device in a prior art.

FIG. 3 is another example of an operational timing chart of the information recording and reproducing device of this embodiment. In this example, reading of ID1 and ID2 have failed while reading of IDs and ID4 have succeeded.

Since reading of ID3 and ID4 has succeeded, pulses are output only on output signals of the third comparator 112 and the fourth comparator 113.

The write gate start pulse generator 114 outputs a start pulse at the timing when the write gate ought to be generated since at least one of the four IDs has been read successfully (when the first condition is satisfied.). Triggered by this pulse, the write gate generator 116 provisionally opens the write gate, i.e. activates the write gate signal. When the write gate is opened, the laser power controller 118 starts the calibration of the laser power and after that starts data recording operation.

When demodulation of ID4 is terminated, the write gate stop pulse generator 115 checks the second recording condition. In FIG. 3 ID4 has been read successfully, i.e. that the result of CRC was "OK". The second recording condition is satisfied since reading of two IDs (ID3 and ID4) has been successful. Therefore the write gate stop pulse generator 115 does not output the stop pulse. Therefore, the recording and reproducing device continues laser power calibration and records data in the data area after completion of the calibration.

Thus this recording and reproducing device re-appraises whether or not the sector is one to be recorded based on the second condition.

The write gate generator 116 thus continues to output the write gate until the recording operation of the data recording area has been completed.

It should be noted that although in this embodiment the description was given such that the ID was written four times and that recording operation of the sector in question was only commenced if two or more of IDs could be read successfully, other settings would be possible within the scope of the essence of the present invention. For example, it is possible to determine the suitable sector for recording by other method instead of by checking CRC code of IDs.

It is also obvious that the condition that ID4 controls the recording condition does not always occur but rather this depends on the read error rate of the IDs. In the present embodiment, for ease of understanding of the description, the number of comparators and of preset registers was shown as being equal to the number of addresses but in practice various embodiments obtained by modification of the circuitry may be considered.

Although the present invention has been described in connection with specified embodiments thereof, many other modifications, corrections and applications are apparent to those skilled in this art. Therefore, the present invention is not limited by the disclosure provided herein but limited only to the scope of the appended claims.

What is claimed is:

1. An information recording and reproducing device for recording data on a recording medium having a plurality of sectors, said sector having an ID area and data area, said ID area containing a plurality of ID data, each ID data carrying information to identify the sector, said device comprising:

a demodulator to demodulate said plurality of ID data;

a first gate controller to generate an enable signal to enable recording of the sector on said recording medium when at least one of the ID data is demodulated by said demodulator; and a second gate controller to determine whether or not the sector is unsuitable for recording when all of ID data are demodulated by said demodulator, and to terminate generating said enable signal when the sector is determined to be unsuitable for recording.

2. The information recording and reproducing device according to claim 1, wherein the sector is determined to be unsuitable for recording when the sector is not identified as a sector to be recorded.

3. The information recording and reproducing device according to claim 1, wherein said demodulator comprises a Viterbi decoder and a demodulation circuit, said demodulator having a delay in processing data.

4. The information recording and reproducing device according to claim 1, further comprising:

a laser unit to generate a laser beam with which said data is recorded on said recording medium; and a laser power controller to start laser power calibration of said laser unit when said first gate controller generates enable signal, and to terminate said power calibration and data recording when said second gate controller terminates generating enable signal.

5. The information recording and reproducing device according to claim 1, wherein said ID data are recorded repeatedly four times, said first gate controller generates said enable signal when a first predetermined recording condition is satisfied at the time when first three of four ID data is demodulated, and said second gate controller terminates generating the enable signal when a second predetermined recording condition is satisfied at the time when four ID data is demodulated.

6. The information recording and reproducing device according to claim 5, wherein said first predetermined recording condition is that at least one of said first three of four ID data is demodulated, and said second predetermined recording condition is that the sector is identified to be suitable for recording by demodulated ID data.

7. A method for controlling a recording operation of a device for recording data on a recording medium having a plurality of sectors, said sector having an ID area and data area, said ID area containing a plurality of ID data, each ID data carrying information to identify the sector, said method comprising:

demodulating said plurality of ID data;

generating an enable signal to enable recording of the sector on said recording medium when at least one of the ID data is demodulated;

determining whether or not the sector is unsuitable for recording when all of ID data are demodulated; and terminating generating said enable signal when the sector is determined to be unsuitable for recording.

* * * * *